United States Patent Office 3,316,333
Patented Apr. 25, 1967

3,316,333
PROCESS FOR THE PREPARATION OF PHOSPHONITES AND PHOSPHINITES
Ingenuin Hechenbleikner, Cincinnati, and Kenneth R. Molt, Kenwood, Ohio, assignors to Carlisle Chemical Works, Inc., Reading, Ohio, a corporation of Ohio
No Drawing. Filed July 13, 1965, Ser. No. 471,710
6 Claims. (Cl. 260—968)

This application is a continuation-in-part of application Serial No. 211,436 filed July 20, 1962, now Patent No. 3,223,736.

The present invention relates to the preparation of phosphonites and phosphinites.

Various methods have been employed in the past to prepare phosphonites and phosphinites. Such procedures suffer from the disadvantages of being too costly and in some instances require high pressure equipment. Also, in many cases, the yields are not as high as desired.

It is an object of the present invention to prepare phosphonites and phosphinites by an improved process.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by reacting an alkyl phosphite, an aryl phosphite, a haloaryl phosphite, or an aralkyl phosphite with an alkyl sodium utilizing less than 3 moles of the alkyl sodium per mole of the phosphite. Preferably not over 2.5 moles of the alkyl sodium are employed and most preferably not over 2 moles of the alkyl sodium per mole of the phosphite.

The equation for the reaction is as follows:

where R is hydrocarbon, e.g., alkyl, aryl, or aralyl or is haloaryl and $m$ is 1 or 2 and R' is alkyl or aralkyl.

In actual practice it has been found that a mixture of several products are obtained having different numbers of RO and R' groups attached to the phosphorus, that is there is obtained a mixture of a phosphonite and a phosphinite. As the amount of alkyl sodium is reduced from 2 moles to 1 mole or less per mole of phosphite, the proportion of phosphonite is increased and the proportion of phosphinite is reduced. The phosphonite and phosphinite formed can be readily separated by fractional distillation.

A small amount of phosphine is also produced and can be removed as a forerun. By keeping the amount of alkyl sodium below 2.5 moles, and preferably not over 2 moles per mole of phosphite the amount of phosphine by-product is kept to a minimum.

Among the compounds which can be prepared by the present invention are dibutyl phosphorus ethoxide (dibutyl ethyl phosphinite),
butyl phosphorus dipentoxide (butyl diamyl phosphonite),
butyldimethyl phosphonite,
dibutyl methyl phosphinite,
butyl diphenyl phosphonite,
dibutyl phenyl phosphinite,
dimethyl phenyl phosphinite,
diethyl phenyl phosphinite,
dipropyl phenyl phosphinite,
diisobutyl phenyl phosphinite,
dihexyl phenyl phosphinite,
dicyclohexyl phenyl phosphinite,
dibenzyl phenyl phosphinite,
dioctyl phenyl phosphinite,
diisodecyl phenyl phosphinite,
didodecyl phenyl phosphinite,
dioctadecyl phenyl phosphinite,
methyl diphenyl phosphonite,
dicyclopentyl phenyl phosphinite,
cyclopentyl diphenyl phosphonite,
ethyl diphenyl phosphonite,
propyl diphenyl phosphonite,
isobutyl diphenyl phosphonite,
hexyl diphenyl phosphonite,
cyclohexyl diphenyl phosphonite,
benzyl diphenyl phosphonite,
octyl diphenyl phosphonite,
isodecyl diphenyl phosphonite,
dodecyl diphenyl phosphonite,
octadecyl diphenyl phosphonite,
dibutyl p-tolyl phosphinite,
butyl di(p-tolyl) phosphonite,
diheptyl O-butylphenyl phosphinite,
heptyl di(O-butylphenyl) phosphonite,
dipropyl m-chlorophenyl phosphinite,
propyl di(m-chlorophenyl) phosphonite,
didecyl 2,5-dichlorophenyl phosphinite,
decyl bis(2,5-dichlorophenyl) phosphonite,
dibutyl p-bromophenyl phosphinite,
butyl di(p-bromophenyl) phosphonite,
dimethyl ethyl phosphinite,
dioctyl α-naphthyl phosphinite,
octyl di-α-naphthyl phosphonite,
methyl diethyl phosphonite,
diethyl methyl phosphinite,
ethyl dimethyl phosphonite,
dibutyl p-decylphenyl phosphinite,
butyl bis(p-decylphenyl)phosphonite,
dihexyl ethyl phosphinite,
hexy diethyl phosphinite,
dibutyl butyl phosphinite,
butyl dibutyl phosphonite,
dibenzyl butyl phosphinite,
benzyl dibutyl phosphonite,
diheptyl benzyl phosphinite,
heptyl dibenzyl phosphonite,
dioctyl decyl phosphinite,
octyl didecyl phosphonite,
dioctadecyl propyl phosphinite,
octadecyl dipropyl phosphonite,
dicyclohexyl ethyl phosphinite,
cyclohexyl diethyl phosphonite.

In naming the above compounds, the groups (or group) directly attached to the phosphorus atom are recited first and then the group (or groups) attached to the phosphorus atom through oxygen.

As the organosodium compound starting material there can be used methyl sodium, ethyl sodium, propyl sodium, isopropyl sodium, isobutyl sodium, butyl sodium, secondary butyl sodium, t-butyl sodium, amylsodium, hexylsodium, cyclohexyl sodium, cyclopentyl sodium, benzyl sodium, octyl sodium, decyl sodium, isooctyl sodium, isodecyl sodium, octadecyl sodium.

The organosodium compound can be preformed or can be formed in situ from metallic sodium and a halohydrocarbon such as 1-chlorobutane, 1-bromobutane, 2-chlorobutane, 1-bromo-2-methylpropane, 2-bromoethyl propane, 1-chloropentane, 1-chlorooctane or the like.

As the starting phosphite, there can be used trimethyl phosphite, triethyl phosphite, tributyl phosphite, trioctyl phosphite, tris decyl phosphite, triphenyl phosphite, tri-p-cresyl phosphite, tri-o-chlorophenyl phosphite, tri-p-brophenyl phosphite, tri-m-cresyl phosphite, tri secondary yl phosphite, tribenzyl phosphite, (tri (2,5-dichlorophenyl) phosphite, diphenyl decyl phosphite, tri-α-naphtylphosphite.

There can be employed inert solvents including hydrocarbons such as varnish makers and painters naphtha, hexane, toluene, benzene or octane.

The reaction can be carried out at atmospheric, subatmospheric or superatmospheric pressure. Frequently the reaction is exothermic and external cooling is employed.

Unless otherwise indicated, all parts and percentages are by weight.

Example 1

To four moles (92 grams) of sodium, dispersed in 300 grams of VM and P naphtha was added a solution of 2.0 moles of 1-chlorobutane and 2.0 moles of trimethyl phosphite over a two-hour period at 40–60° C. A cooling bath was used to maintain the temperature. After quenching with ice water, the organic layer was distilled and there was obtained 158 grams of butyl dimethyl phosphonite, $BuP(OCH_3)_2$, boiling at 89–92° C. at 15 mm. Hg, and 74 grams of dibutyl methyl phosphonite $Bu_2POCH_3$, boiling at 103–106° C. at 15 mm. Hg. A small quantity of tributyl phosphine was also isolated.

Example 2

To four moles (92 grams) of sodium, dispersed in 300 grams of VM and P naphtha was added a solution of 2.0 moles of 1-chlorobutane and 2.0 moles of triphenyl phosphite over a two-hour period at 40–60° C. The mixture was worked up in the manner described in Example 1. The products were 201 grams of butyl diphenyl phosphonite, $BuP(O\,phenyl)_2$, distilling at 135–140° C. at 1 mm. Hg and 90 grams of dibutyl phenyl phosphinite, $Bu_2PO\,phenyl$, distilling at 120–125° C. at 1 mm. Hg. A small amount of tributyl phosphine distilled as a forerun at 85–90° C. at 1 mm. Hg.

Example 3

The procedure of Example 1 was repeated replacing the 1-chlorobutane by 2 moles of octyl chloride and replacing the trimethyl phosphite by 2 moles of triamyl phosphite to obtain a mixture of octyl diamyl phosphonite and dioctyl amyl phosphinite.

What is claimed is:

1. A process of preparing a compound having the formula $R'_mP(OR)_{3-m}$ where R is selected from the group consisting of alkyl, phenyl, lower alkyl phenyl, naphthyl, benzyl, bromophenyl, monochlorophenyl and dichlorophenyl, R' is selected from the group consisting of alkyl and benzyl and m is an integer selected from the group consisting of 1 and 2 comprising reacting one mole of a phosphite having the formula $(RO)_3P$ with up to 2.5 moles of a compound having the formula R'Na.

2. A process according to claim 1 wherein there are employed 1–2 moles of the compound having the formula R'Na.

3. A process according to claim 1 wherein R' is alkyl.

4. A process of preparing a member of the group consisting of phosphonites and phosphinites having the formula $R'_mP(OR)_{3-m}$ where R is alkyl, R' is alkyl and m is an integer selected from the group consisting of 1 and 2 comprising reacting 1 mole of a trialkyl phosphite with 1 to 2.5 moles of an alkyl sodium.

5. A process of preparing a member of the group consisting of phosphonites and phosphinites having the formula $R'_mP(OR)_{3-m}$ where R is carbocyclic aryl of the phenyl series, R' is alkyl and m is an integer selected from the group consisting of 1 and 2 comprising reacting 1 mole of a phosphite having the formula $(RO_3)P$ with 1 to 2.5 moles of an alkyl sodium.

6. A process of preparing a member of the group consisting of phosphonites and phosphinites having the formula

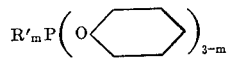

where R' is alkyl and m is an integer selected from the group consisting of 1 and 2 comprising reacting 1 mole of triphenyl phosphite with 1 to 2.5 moles of an alkyl sodium.

References Cited by the Examiner

UNITED STATES PATENTS 2,899,454   8/1959   McBee et al. _____ 260—968

CHARLES B. PARKER, *Primary Examiner.*

BERNARD BILLIAN, *Assistant Examiner.*